United States Patent

Edele et al.

[11] 3,729,767
[45] May 1, 1973

[54] DEVICE FOR FASTENING A WINDSHIELD WIPER ARM ON A DRIVE SHAFT

[75] Inventors: Reinhard Edele, Bietigheim; Alfred Kohler; Kurt Bauer, both of Kleiningersheim, all of Germany

[73] Assignee: SWF-Spezialfabrik fuer Autozubehoer Gustav Rau GmbH, Bietigheim, Germany

[22] Filed: Dec. 29, 1971

[21] Appl. No.: 213,472

[30] Foreign Application Priority Data

Feb. 4, 1971  Germany..................P 21 05 101.4

[52] U.S. Cl.............................................15/250.34
[51] Int. Cl................................................B60s 1/34
[58] Field of Search....................15/250.31, 250.34, 15/250.35, 250.2, 250.19; 287/53 WA

[56] References Cited

UNITED STATES PATENTS

| 2,202,311 | 5/1940 | Folberth et al. | 15/250.34 |
| 3,058,143 | 10/1962 | Bock et al. | 15/250.34 |
| 3,548,442 | 12/1970 | Stratton | 15/250.34 |

FOREIGN PATENTS OR APPLICATIONS

| 173,031 | 11/1952 | Austria | 15/250.34 |
| 578,959 | 7/1958 | Italy | 15/250.34 |

Primary Examiner—Peter Feldman
Attorney—Toren & McGeady

[57] ABSTRACT

A receiving member, formed of a first section and a second section which extends laterally from the first section, is used for connecting a windshield wiper arm to a drive shaft. An opening is provided to the first section in which the drive shaft is secured. The wiper arm is articulated to the second section at a position spaced from the opening in the first section. To prevent leakage into the drive shaft bearing, a cover member is articulated to the first section of the receiving member and fits over the first section and a portion of the second section. The cover member is arranged so that it can be pivoted upwardly from the receiving member for permiting access to the drive shaft regardless of the position of the wiper arm. Further, the pivot axes of the cover member and the wiper arm in the receiving member are disposed in parallel relationship.

17 Claims, 2 Drawing Figures

Patented May 1, 1973

Inventors
REINHARD EDELE
ALFRED KOHLER
KURT BAUER
BY Toren and McGeady
ATTORNEYS

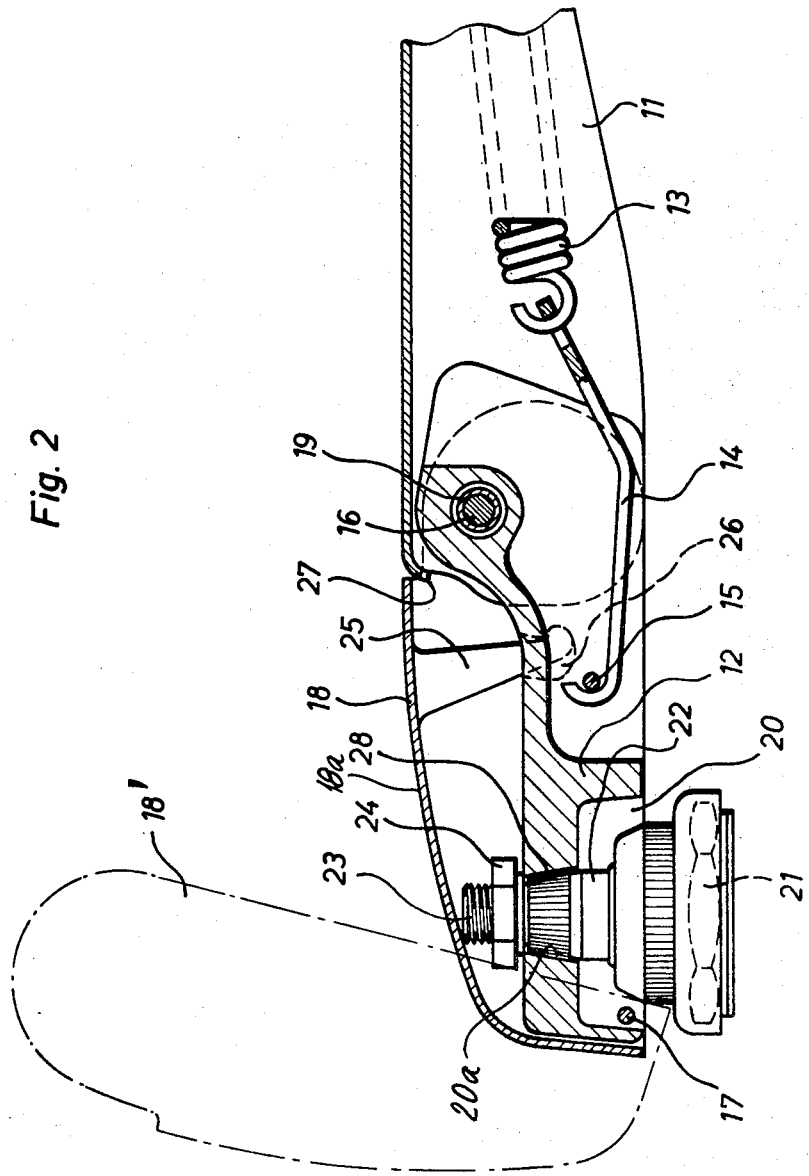

DEVICE FOR FASTENING A WINDSHIELD WIPER ARM ON A DRIVE SHAFT

SUMMARY OF THE INVENTION

The invention is directed to a device for fastening a windshield wiper arm on a drive shaft, especially for use with motor vehicles, and, more particularly, it concerns a receiving member having a socket-type section in which the drive shaft is secured and another section to which the wiper arm is articulated. Further, the invention includes a cover member which is articulated to the receiving member and extends over a portion of its upper surface.

In known devices for securing a windshield wiper arm to a drive shaft, socket-type receiving parts are provided with a stop spring which extends around a shoulder provided on the drive shaft and connects the receiving part with the drive shaft by a stop connection. Such devices are disadvantageous because the stop element is not readily accessible for removing the wiper arm, because it is covered by the receiving part which has a cap-shaped configuration. Further, there is a limited retaining force which can be produced by means of the stop connection so that such devices are not suitable for use with large wiper arms.

Other devices are also known for fastening a wiper arm on a drive shaft which use a socket-type receiving part that is non-rotatably attached on a stop cone provided on the end of the drive shaft and is locked to the drive shaft by means of a nut. The drive shaft, the receiving part and the nut are covered by a cap member so that the axial bearing for the shaft is protected against the leakage of any liquid. Such a cap member can be attached on the receiving part, as shown in British Pat. 756,229, so that the elastic walls of the cap member deflect inwardly and the cap member can be hinged down onto the wiper arm. This second type of device has the disadvantage that, with the cap displaced outwardly from the wiper arm, the wiper bearing is covered when the wiper arm is pivoted outwardly from its normal position.

Therefore, it is the primary object of the present invention to provide an improved device for fastening a wiper arm on a drive shaft, particularly for use in motor vehicles, in which a socket-type receiving member is fixed to the end of the drive shaft and the wiper arm is articulated to the receiving member at a position spaced from the drive shaft. Further, a cap is articulated to the receiving member on the opposite side of the drive shaft from the position at which the wiper arm is connected to the receiving part. As a result, with the cover pivoted outwardly from the receiving member, it is possible to gain access to the wiper bearing regardless of the position into which the wiper arm is pivoted relative to the receiving member. This feature of the accessibility of the wiper bearing is achieved due to the spaced relationship of the points of articulation of the cover member and the wiper arm to the axis of the drive shaft in the receiving part and to one another. In this arrangement the cover member can be displaced between a closed position on the receiving member and a open position spaced outwardly from the receiving member independently of the position of the wiper arm relative to the receiving member. Accordingly, the cover member can be displaced for gaining access to the drive shaft bearing without any interference caused by the position of the wiper arm.

There are a number of different possibilities for articulating the cover member to the receiving member. In one arrangement a hinge pin can be positioned in the receiving member and secured within recesses in the cover member. Further, the hinge pin can be fixed to the cover member and positioned within a bore extending through the receiving member. Another possible arrangement is to position the hinge pin in aligned bores extending through the cap and the receiving member. Preferably, the pivot axis between the cover member and the receiving member extends in parallel relationship with the pivot axis between the receiving member and the wiper arm.

The cover member is maintained in the closed position on the receiving member by means of at least one stop element which engages in a corresponding recess or hole in the receiving member. In one embodiment, cam surfaces can be provided on the side walls of the cover member for engagement within offset surfaces formed in the receiving member. Alternatively, the positions of the cams in the offset surfaces can be reversed in the receiving member and the cover member. A particularly simple connection between the two can be provided if the portion of the cover member extending over the receiving part has a downwardly extending latch which engages within a correspondingly shaped hole in the receiving member.

In one embodiment of the present invention, the transition between the cover member and the wiper arm is designed so that the side walls of the cover member enclose the pivot structure between the receiving member and the wiper arm, while the top wall of the cover member terminates at a point short of the pivot structure and affords a cover over the adjacent end of the wiper arm which is bent downwardly toward the pivot structure.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 2 is a view similar to FIG. 1 of another embodiment of the present invention.

DETAILED DESCRIPTION OF THE INVENTION

Figure 1:
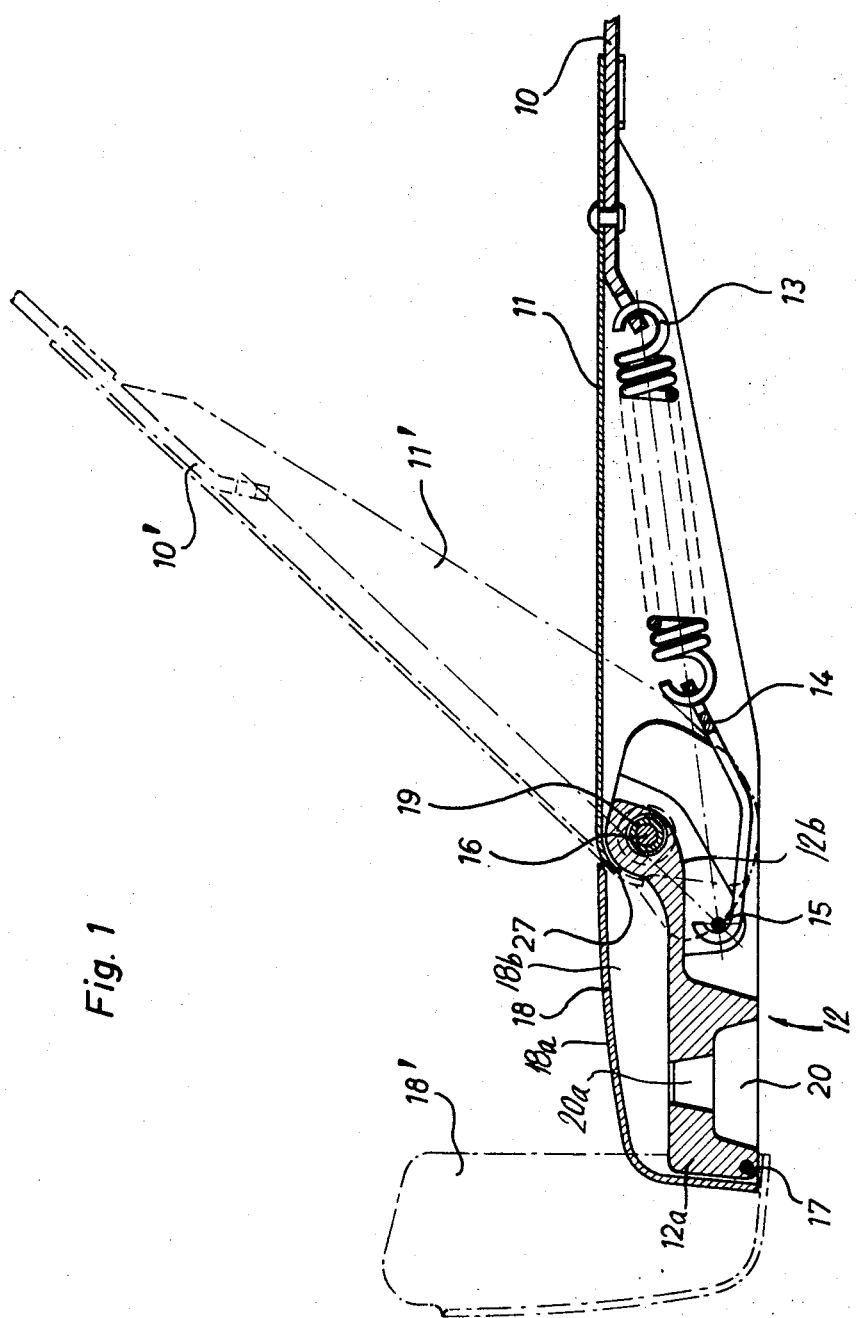
FIG. 1 is a partial longitudinal sectional view of the device embodying the present invention for securing a wiper arm onto a drive shaft.

As shown in FIG. 1, one end of a wiper arm 10 is fixed to a coupling 11 which extends from the wiper arm and is articulated to a socket-type receiving member 12. The end of the wiper arm adjacent its connection to the coupling is bent downwardly away from the coupling and forms an eye into which one end of a pressure spring 13 is secured.

The receiving member 12 consists of a first section 12a within which a socket 20 is formed and a second section 12b which extends laterally from the first section, to the right as shown in FIG. 1, into which the coupling 11 is pivotal secured. An opening 20a extends through the first section from its socket 20 for receiving the end of the drive shaft 22, note FIG. 2. Within the second section 12b, spaced laterally from its point of connection to the first section 12a, is a bore within which a hinge pin 16 is positioned within a bearing bush 19. The coupling 11 is mounted on the hinge pin 16 so that the coupling 11 and the wiper arm 10 as shown in full lines, can be pivoted upwardly about the hinge pin 16 to the position of the wiper arm 10' and the coupling 11' shown in phantom in FIG. 1. In the second section 12b below the pin 16 and closer to the first section 12a is a bolt 15 onto which one end of a yoke 14 is secured with the other end of the yoke attached to the end of the pressure spring spaced from the wiper arm 10. As indicated in FIG. 1, the wiper arm 10 and coupling 11 can be pivoted for about 45° about the hinge pin 16. Further, the coupling 11 at its end 27 adjacent the second section 12b is curved downwardly in the general configuration of the adjacent surface of the second section 12b. When the wiper arm and coupling are pivoted, the end 27 moves downwardly along the upper surface of the second section. As can be seen in FIG. 1, a cover member 18 is fitted over the receiving member 12 and its end located above the second section 12b terminates at a point spaced between the opening 20a and the pin 16 but adjacent the pin 16 so that the end of the cover member is located above the end 27 of the coupling 11 and does not interfere with the pivotal movement of the end 27 when the wiper arm and coupling are moved between the positions shown in FIG. 1.

The cover member 18 is pivotally secured to the first section 12a of the receiving member 12 by means of a hinge pin 17. As can be noted in FIGS. 1 and 2, the hinge pin is located on the opposite side of the socket 20 from the pin 16. Further, the axes of the pins 16 and 17 are disposed in parallel relationship and extend transversely of the axis of the opening 20a through the first section 12a of the receiving member 12. The cover member consists of a top wall 18a and side walls 18b. The side walls 18b in the closed position of the cover member, that is the position shown in full lines in FIG. 1, laterally enclose the pivot structure between the wiper arm-coupling and the receiving member. The side walls 18b are located laterally outwardly from the side walls of the coupling 11. As can be seen from the dashed lines in FIG. 1 indicating the upwardly displaced position of the cover member 18' the top wall 18a does not extend as far to the right, or upwardly as shown in dashed lines, as the side walls 18b.

As indicated in FIG. 1 by the phantom showing of the cover member, it can be displaced between its closed position covering the better portion of the receiving member 12 and its open position, swung upwardly from the receiving member, so that it is independent of the position of the wiper arm-coupling. When the cover member is in its open position it uncovers the fastening means which secure the receiving member onto the end of the drive shaft 22.

In FIG. 2 the drive shaft 22 is shown extending through the opening 20a in the first section 12a of the receiving member 12. The bearing bush of the wiper bearing is secured in the body of the motor vehicle by means of lock nut 21. The receiving member 12 is non-rotatably secured on the drive shaft 22 by means of the stop cone 28 with external teeth which fits within the correspondingly shaped frusto-conical opening 20a in the first section 12a. Above the first section 12a, a lock nut 24 is secured on the threaded portion 23 of the drive shaft and locks the receiving member to the drive shaft.

As shown in FIG. 2, in the second section 12b of the receiving member 12, located between the pin 16 and the first section 12a, is a hole 26. Extending downwardly from the underside of the top wall 18a of the cover member 18 is a latch member 25 which, in the closed position of the cover member, fits into the hole 26 and releasably locks the cover member in its closed position. As a result, the cover member 18 is held firmly but detachably on the receiving member 12.

Alternatively, in place of the latch member 25 and the hole 26, stop elements can be arranged on the side walls 18b of the cover member and on the corresponding surfaces of the receiving member 12 for holding the cover member in the closed position. One example of an alternate arrangement would be to use cams on one of the surfaces of the cover member and the receiving member with offset surfaces on the other into which the cams could engage and secure the cover member in the closed position.

Another advantage of the applicants' arrangement is the ability to secure the cover member 18 on the receiving member 12 so that the cover member cannot be lost. Further, various arrangements can be provided for pivotally connecting the cover member to the receiving member. The bearing pin 17 can be introduced through aligned bores in the side walls of the cap and in the first section of the receiving member 12 with the pin secured in that position. However, it would also be possible to secure the pin in only one of the cover member and receiving member and to connect it to the other member by means of a stop or other element. As can be noted in the drawing, the bearing pin 17 is arranged as close as possible, on the receiving member, to the surface of the vehicle in which the drive shaft 22 is positioned. Accordingly, when the cover member is pivoted to its open position, it does not extend too far away from the vehicle and also leaves the end of the drive shaft with the fastening means accessible.

While specific embodiments of the invention have been shown and described in detail to illustrate the application of the inventive principles, it will be understood that the invention may be embodied otherwise without departing from such principles.

What is claimed is:

1. A device for mounting a windshield wiper arm, particularly for use on motor vehicles, on a drive shaft, comprising a receiving member having a first section forming a socket therein arranged to fit over the drive shaft, said first section having an opening therethrough communicating with the socket and arranged to engage the drive shaft securely therein, and a cover member arranged to fit over said receiving member, wherein the improvement comprises that said receiving member includes a second section extending laterally from said first section transversely of the axis of the opening in said first section, first means for articulating the wiper arm to said second section at a position spaced outwardly from said first section, second means for articulating said cover member to said first section at a position located on the opposite side of the opening through said first section from said first means, and said cover member arranged for displacement between a closed position where it covers said first section and at least a portion of said second section of said receiving member and an open position where access to the opening through said first section is available.

2. A device, as set forth in claim 1, wherein said first means comprises a bore extending through said second section with the axis of said bore disposed transversely of the axis of the opening through said first section.

3. A device, as set forth in claim 2, wherein said first means includes a bearing bush positioned within the bore in said second section, and a pin positioned within said bearing bush and arranged to articulate the wiper arm to said receiving member.

4. A device, as set forth in claim 1, wherein said second means comprises a bore extending through said first section transversely of the opening therethrough, a hinge pin extending through the bore, said cover member mounted on said hinge pin so that it can be pivoted between its opened and closed positions.

5. A device, as set forth in claim 4, wherein said hinge pin is fixed in said first section and said cover member is shaped to provide seats for the opposite ends of said hinge pin.

6. A device, as set forth in claim 4, wherein said hinge pin is fixed in said cover member and is held within the bore in said first section.

7. A device, as set forth in claim 4, wherein said cover member has openings therethrough on the opposite sides of said first section aligned with the bore through said first section and said hinge pin extends through the openings in said cover member and the bore in said first section.

8. A device, as set forth in claim 1, wherein the axes of articulation of the wiper arm and said cover member to said receiving member are disposed in parallel relationship.

9. A device, as set forth in claim 1, wherein first stop means are formed on said cover member and second stop means are formed on said receiving member, and first and second stop means are arranged in cooperating relationship for releasably securing said cover member in its closed position on said receiving member.

10. A device, as set forth in claim 9, wherein said first stop means comprises at least one stop element fixed to said cover member and projecting therefrom toward said receiving member, and said second stop member comprising a seat-like member on said receiving member for engagement by said stop element in the closed position of said cover member on said receiving member.

11. A device, as set forth in claim 9, wherein said cover member has a top wall and side walls extending downwardly from said top wall and in the closed position said top wall is located above said first and second positions in the closed position and said side walls extend downwardly over the sides of said first and second sections.

12. A device, as set forth in claim 11, wherein said first stop means comprises offset surfaces on said side walls of said cover member and said second stop means comprises cams formed on said receiving member and arranged to engage within said offset surfaces.

13. A device, as set forth in claim 11, wherein said first stop means comprises cams formed on said side walls of said cover member and said second stop means comprises offset surfaces on said receiving member arranged to receive said cams on said cover member.

14. A device, as set forth in claim 9, wherein said first stop means comprises a latch element secured to and extending downwardly from said top wall of said cover member, said second stop means comprises a hole formed in said second section of said receiving member, and said hole being arranged to receive and hold said latch element in a releasable manner.

15. A device, as set forth in claim 1, wherein said cover member has a top wall and side walls extending downwardly from said top wall and in the closed position said top wall is located above said first and second sections in the closed position and said side walls extend downwardly over the sides of said first section, said side walls laterally covering said first means and said second means, and said top wall covers the upper surface of said first section and extends over a portion of the upper surface of said second section and terminates at a location spaced between the axis of the opening in said first section and the axis of said first means, and the end of said top wall adjacent the axis of said first means being arranged to extend over the end of the wiper arm connected to said first means.

16. A windshield wiper device such as for use on motor vehicles and arranged for attachment to a drive shaft, comprising a receiving member having a first section forming a socket therein, said first section having an opening therethrough within the socket so that the drive shaft can extend into the socket and through the opening for securely attaching it to said receiving member, a cover member arranged to fit over said receiving member, a second section extending laterally from said first section transversely of the axis of the opening in said first section, a bore extending through said second section and the axis of said bore is disposed transversely of the axis of the opening through said first section, a bearing bush positioned within the bore in said second section, a pin positioned within said bearing bush and arranged for articulating the wiper arm to said receiving member, a bore extending through said first section transversely of the opening through said first section and in parallel relationship with the bore in said second section, a hinge pin extending through the bore, said cover member mounted on said hinge pin so that it can be pivoted for uncovering said receiving member and affording access to the opening through said first section, a coupling member articulated to said pin positioned in the bore in said second section and said coupling member extending outwardly from said second section in the opposite direction from said first section, a wiper arm fixed to said coupling section at a position spaced outwardly from said second section, said coupling member having an upper flange located above said pin in said second section and extending to a point between said pin and the axis of the opening in said first section, the end of said flange being bent downwardly toward said second section, said cover member having a top wall and side walls extending downwardly from said top wall and in the closed position of said cover member said top wall is located above said first and second sections and said side walls extend downwardly over the sides of said first and second sections, and the end of said top wall adjacent said pin in said second section terminating between said pin and the axis of the opening in said first section and disposed above and covering the downwardly bent end of said second section.

17. A windshield wiper device, as set forth in claim 16, wherein a pressure spring is secured to the end of said wiper arm located more closely to and in spaced relationship from said second section, a bolt connected to said second section, a yoke positioned on said bolt and secured to the opposite end of said spring from the end secured to said wiper arm.

* * * * *